United States Patent
Mori et al.

[11] Patent Number: 5,594,603
[45] Date of Patent: Jan. 14, 1997

[54] SEEK CONTROL SYSTEM BASED UPON A DETECTED TEMPERATURE OF A POSITIONING MECHANISM IN A DISK DEVICE

[75] Inventors: Kazunori Mori; Nobuyuki Suzuki; Taturo Sasamoto, all of Kawasaki, Japan

[73] Assignee: Fujitsu Limited, Japan

[21] Appl. No.: 326,471

[22] Filed: Oct. 20, 1994

[30] Foreign Application Priority Data

Dec. 2, 1993 [JP] Japan ................................. 5-302467

[51] Int. Cl.$^6$ .......................... G11B 5/596; G11B 33/14; G05B 11/01
[52] U.S. Cl. .................... 360/78.04; 360/78.09; 360/97.02; 318/560
[58] Field of Search .......................... 360/78.04, 78.09, 360/97.02; 318/560, 561, 565, 434

[56] References Cited

U.S. PATENT DOCUMENTS 5,128,813 7/1992 Lee .................................... 360/78.06 X
5,268,804 12/1993 Wallis .............................. 360/78.09 X

FOREIGN PATENT DOCUMENTS 0356977 3/1990 European Pat. Off. ............ 360/97.02
59-107404 6/1984 Japan .
60-85473 5/1985 Japan .
0132473 2/1989 Japan .
1303679 12/1989 Japan .

*Primary Examiner*—W. Chris Kim
*Assistant Examiner*—Regina Neal
*Attorney, Agent, or Firm*—Greer, Burns & Crain, Ltd.

[57] ABSTRACT

A seek control system in a disk system, in which the object measured is a mechanism including a voice coil motor which positions a head, and in which the temperature of the voice coil motor is detected and seek operations are controlled based on the thus detected temperature, includes a unit for determining the amount of heat causing the temperature rise of the object under measurement as the square of a voice coil motor current command value multiplied by predetermined coefficients; a unit for integrating the result obtained by subtracting the amount of naturally radiated heat from the amount of heat including the amount of heat causing the thus determined temperature rise, to determine the amount of heat in the object; and a unit for detecting the temperature of the object in accordance with the thus determined amount of heat in the object. Preferably, a calculation concerning the ratio of the amount of heat in the object to the thermal capacity of the object is performed to detect the temperature of the object under measurement.

14 Claims, 15 Drawing Sheets

Fig.9

A: ROM CONTENTS

| |
|---|
| K (CONSTANT) |
| θ (CONSTANT DEPENDENT UPON THERMAL RESISTANCE) |
| $C_v$ (THERMAL CAPACITY OF OBJECT UNDER MEASUREMENT) |
| $t_e$ (ENVIRONMENTAL AMBIENT TEMPERATURE) |
| $t_s$ (SAMPLING TIME) |
| ⋮ |
| a, b (CONSTANTS) |

B: RAM CONTENTS

| |
|---|
| $I_v$ (VCM CURRENT COMMAND VALUE) |
| $T_v$ (TEMPERATURE OF OBJECT UNDER MEASUREMENT) |
| $\Delta Q_{v1}$ (AMOUNT OF HEAT CAUSING A TEMPERATURE RISE) |
| $\Delta Q_{v2}$ (AMOUNT OF NATURALLY RADIATED HEAT) |
| $Q_v$ (AMOUNT OF HEAT IN OBJECT UNDER MEASUREMENT) |
| ⋮ |
| TIMER DATA (FROM SOFTWARE TIMER) |

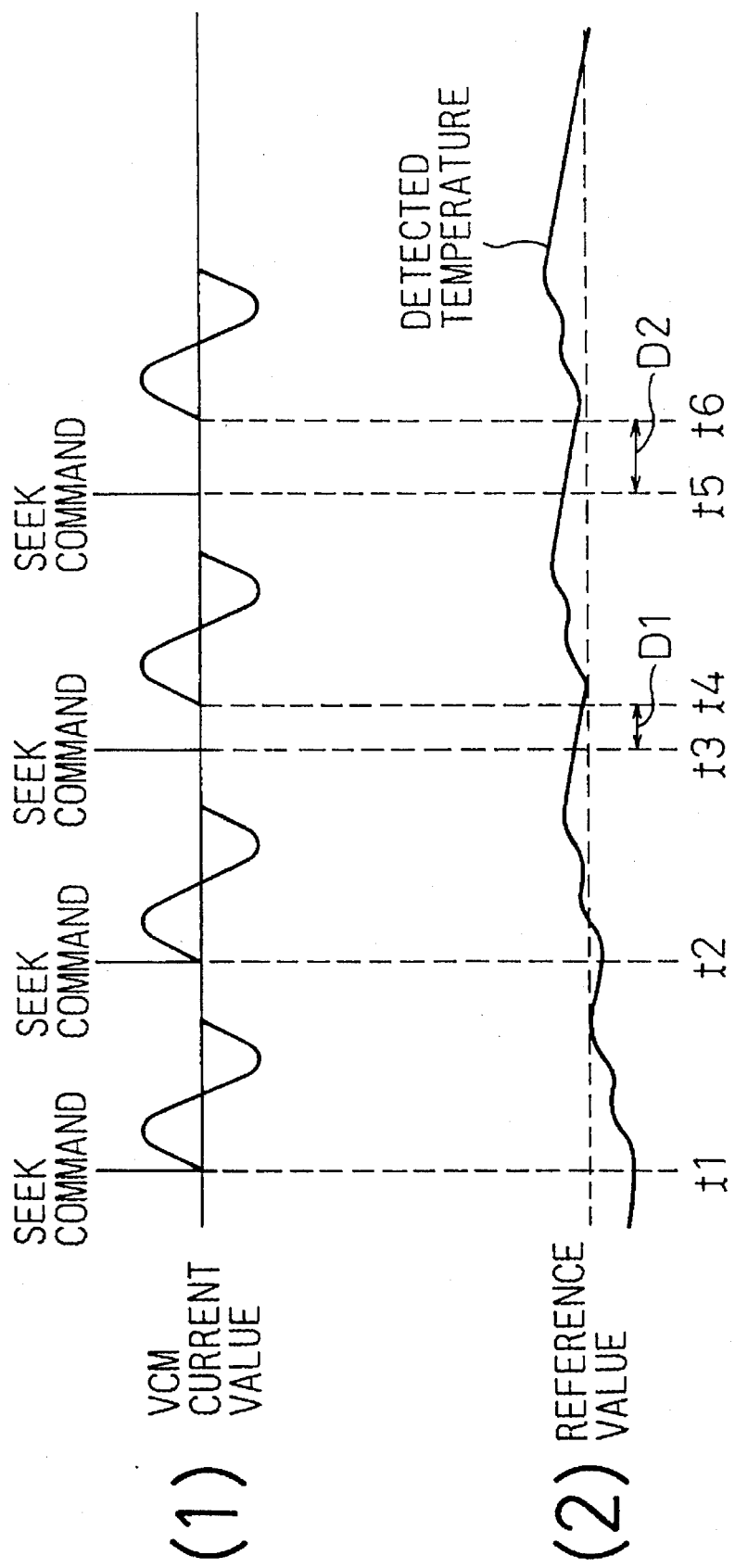

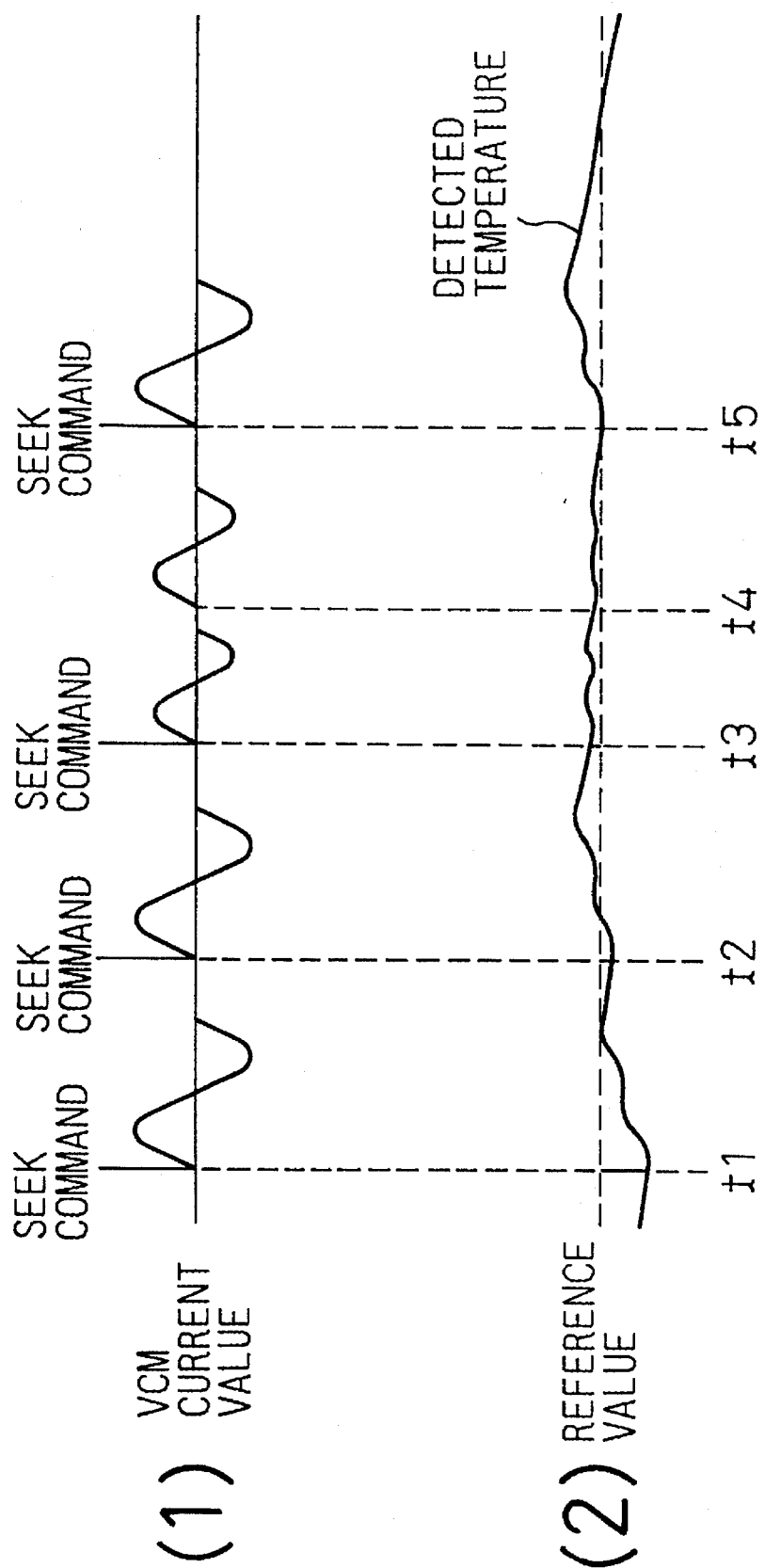

SEEK CONTROL SYSTEM BASED UPON A DETECTED TEMPERATURE OF A POSITIONING MECHANISM IN A DISK DEVICE

BACKGROUND OF THE INVENTION

1. Field of the Invention

The present invention relates to a seek control system in a disk device, e.g., a magnetic disk device. More specifically, the present invention relates to a technique for controlling a disk device during seek operations, as an overheating countermeasure of a disk device, which is used to counter overheating of a voice coil motor (usually abbreviated to "VCM") in a magnetic disk device, etc.

2. Description of the Related Art

In recent years, demands for magnetic disk devices with high processing speed (e.g., high access speed) have resulted in the drive of a large current through the VCM during seek operations in order to obtain the maximum possible performance. For this reason, the problem occurs that, when seek operations are performed continuously, with a large current supplied to the VCM, the VCM may be damaged by overheating. A solution to this problem is required.

Here, to enable the configuration of a conventional seek control system in a disk device to be understood more clearly, the related art and the disadvantages therein will be described with reference to the related drawings of FIG. 1 through FIG. 3.

FIG. 1 is a block diagram showing a configuration of a conventional magnetic disk device; FIG. 2 is a block diagram for explaining a technique for detecting the temperature of a VCM according to the prior art; and FIG. 3 is a diagram showing a VCM current and a temperature waveform related to the prior art.

In FIG. 1 through FIG. 3, 1 denotes a magnetic disk device (magnetic disk drive); 2 denotes a disk enclosure (sometimes abbreviated to "DE"); 3 denotes a spindle motor; 4 denotes a spindle; 5 denotes a plurality of magnetic disks, 6 denotes a voice coil motor (usually abbreviated to "VCM"); 7 denotes the magnetic heads; and 9 denotes a control section.

§1. Description of the Magnetic Disk Device (Refer to FIG. 2)

As shown in FIG. 1, the magnetic disk device 1 is provided with a disk enclosure 2 and a control section 9. The disk enclosure 2 has a spindle 4 which is driven rotatably by a spindle motor 3. This spindle 4 has a plurality of magnetic disks 5.

The disk enclosure 2 contains the voice coil motor 6 which is controlled by the control section 9, this voice coil motor 6 driving the magnetic heads 7. Seek operations by the voice coil motor 6 are controlled by the control section 9. Typically, the control section 9 is constituted by a CPU (Central Processing Unit) of a computer system.

§2. Description of the Voice Coil Motor Overheating Countermeasure Control (Refer to FIG. 2)

FIG. 2 explains a technique for detecting the temperature of a VCM according to the prior art. As mentioned above, to achieve high processing speed in a magnetic disk device, during seek operations, a large current was passed through the voice coil motor 6 in the prior art. When seek operations are performed continuously with such a large current, the voice coil motor 6 may be damaged from overheating.

To solve this problem, as a countermeasure against voice coil motor overheating, the following type of control was performed by the control section 9. A multiplier 11, an integrator 12, a comparator 13 and other elements are provided in the control section 9, these parts being used to detect and monitor the temperature of the voice coil motor 6, and to use the thus detected temperature to perform overheating countermeasure control of the voice coil motor 6.

In the above-noted overheating countermeasure control of the voice coil motor 6, the multiplier 11 calculates the square of the voice coil motor current, i.e., an input current (the amount of heat generated in the coil being proportional to the square of this current), and determines the calculated value as the amount of heat generated per second. Further, this calculated value is integrated by the integrator 12, and the thus integrated value is used to approximate the voice coil motor temperature (coil temperature of a voice coil motor). In addition, the comparator 13 operates to compare the output of the integrator 12 (the integrated value) with a reference value to determine the detection signal.

In the control section 9, the temperature of the voice coil motor 6 is monitored by means of the above-noted process, and when the temperature exceeds the reference value, the above-noted detection signal was used to perform overheating countermeasure control when seek operations were performed. In doing this, the two following techniques for overheating countermeasure control could be used.

<1>: When seek operations were performed, if the above-noted temperature exceeds a reference value, the voice coil motor current is controlled to limit the generation of heat by the voice coil motor.

<2>: When seek operations were performed, if the above-noted temperature exceeds a reference value, the start and stop of a given seek operation are delayed to limit the generation of heat by the voice coil motor.

§3. Description of the Voice Coil Motor Current and the Temperature Waveform (Refer to FIG. 3)

FIG. 3 shows the VCM (voice coil motor) current and the temperature waveform related to the prior art. When overheating countermeasure control is performed on the VCM by the above-noted method <2>, the VCM current and the temperature waveform are as shown in this drawing.

In FIG. 3, (1) denotes a waveform of the VCM current value, and (2) denotes a waveform showing the detected temperature which is output from the comparator 13. Each of time t1, t2, t3, t4, and so forth, in time base of FIG. 3 indicates the time when each seek command starts to be issued.

In this example, a sequential control is performed as follows. If a seek command is issued at time t1, the detected temperature at this time is a value lower than the reference value (dashed line in FIG. 3). Therefore, the VCM current is immediately set as shown in FIG. 3 and a seek control is performed.

In the timing in which the seek command is issued at the time t1, the detected temperature is a value higher than the reference value. In this case, the time for the start of a seek control is delayed from time t2 by time $\Delta t$, and then a seek control is performed at the time t3, which is defined as $t3 = t2 + \Delta t$.

In the timing in which the seek command is issued at time t4, the detected temperature is a value higher than the reference value. In this case, the time for the start of a seek control is delayed from time t4 by time Δt, and then a seek control is performed at the time t5, which is defined as t5 =t4+Δt.

In the timing in which the seek command is issued at time t6, the detected temperature is a value higher than the reference value. In this case, the time for the start of a seek control is delayed from time t6 by time Δt, and then a seek control is performed at the time t7, which is defined as t7 =t6+Δt. The above-mentioned sequential control is continued in the same manner thereafter.

In the above-described technique regarding the related art, the following three problems exist.

[1]: In performing a process for detecting the temperature of the VCM, the control section operates to monitor the VCM temperature, merely by determining the square of the VCM current as the heat generated each one second by the VCM and integrating the square of the VCM current to approximate the VCM temperature. This resulted in an increase of error in the detected VCM temperature.

Also, when an overheating countermeasure control is performed based on the above-noted detected temperature, such a control is carried out by using the detected temperature with a large error. Therefore, it is not possible to carry out adequate overheating countermeasure control with high accuracy.

[2]: In a control of the VCM current as described above in the first technique <1> for VCM overheating countermeasure control, the seek time required for completing seek operations becomes long, because of a decrease of the speed of the VCM. Therefore, the throughput of the whole system, indicating the amount of a job which a computer system can process in a predetermined duration, may be reduced. Further, since the control according to the first technique <1> is carried out by using the detected temperature with a large error, it is not possible to carry out adequate overheating countermeasure control with high accuracy.

[3]: In performing a VCM overheating countermeasure control by delaying the start and stop of a given seek operation, as described in the second technique <2> for VCM overheating countermeasure control, a process for seek control is delayed to the extent that the start of a seek control is delayed. In this case, the throughput of the whole system inevitably decreases, due to a delay of a process for seek control.

However, when a seek operation with a large VCM current and with a large delay is performed continuously, the decrease in the throughput has only a small effect in limiting the VCM temperature so that a coil temperature of the VCM is not overheated.

SUMMARY OF THE INVENTION

In view of these problems, the main object of the present invention is to provide a seek control system in a disk device, which can detect the VCM temperature with high accuracy, to carry out an adequate overheating countermeasure control.

A further object of the present invention is to provide a seek control system in a disk device, which can carry out proper seek control on the basis of the detected VCM temperature, in a manner such that the VCM temperature does not rise excessively without a large delay in a process for seek control.

A still further object of the present invention is to provide a seek control system in a disk device, which can minimize the decrease in the throughput of the whole system, which may occur due to a delay in a process for seek control.

To attain these objects, the seek control system according to the present invention is directed to a disk device in which the object that is to be measured is a mechanism, including a voice coil motor (VCM), which positions a head for carrying out read/write operations, the temperature of the VCM being detected and a seek operation in a disk device being controlled based on the thus detected temperature of the VCM.

In this case, the seek control system includes a means for determining the amount of heat causing the temperature rise of the object under measurement as the square of a VCM current command value, by which the VCM is controlled to position the head, multiplied by predetermined coefficients; a means for integrating the result obtained by subtracting the amount of naturally radiated heat from the amount of heat including the amount of heat of the thus determined temperature rise, to determine the amount of heat in the object under measurement; and a means for detecting the temperature of the object under measurement in accordance with the thus determined amount of heat in the object under measurement.

Preferably, in the seek control system of the present invention, a calculation concerning the ratio of the amount of heat in the object under measurement to the thermal capacity of the object under measurement is performed to detect the temperature of the object under measurement by using the above-mentioned means for detecting the temperature.

Further, preferably, the seek control system further includes a memory unit for storing the thus detected temperature of the object under measurement. Further, when a host device issues a command of seek control for controlling seek operations, the seek control is performed so as to automatically insert a time interval, in accordance with the thus detected temperature stored in the memory unit, between a given seek operation and the subsequent seek operation.

Alternatively, when a host device issues a command of seek control for controlling a seek operation, each seek operation is carried out by dividing into a plurality of minor (or smaller) seek operations, in accordance with the thus detected temperature stored in the memory unit.

Alternatively, the start and stop of the rotation and the rotational speed of a cooling fan, for suppressing the temperature rise of the object under measurement, is controlled in accordance with the detected temperature stored in the memory unit.

Further, preferably, the means for determining the amount of heat of the temperature rise, the means for integrating the result, and the means for detecting the temperature of the object under measurement are realized by a CPU of a computer system.

Further, preferably, when a seek control is performed in accordance with the thus detected temperature, the seek control system operates to report the start and stop of the seek control, and the contents of control process related to the seek control, to the host device.

Further, preferably, the seek control system operates to set and cancel a control function for performing seek control in accordance with the thus detected temperature, on the basis of an instruction from the host device.

Further, preferably, the memory unit is constituted by a RAM of a computer system.

In such a configuration of the seek control system, it becomes possible to detect the VCM temperature with high accuracy, by taking into consideration the amount of naturally radiated heat in determining the amount of heat in the object under measurement.

Further, on the basis of the thus detected VCM temperature, it also becomes possible to perform a seek control so that this VCM temperature does not rise excessively, thereby minimizing a reduction in the throughput of a disk device, e.g., a magnetic disk device.

BRIEF DESCRIPTION OF THE DRAWINGS

The above object and features of the present invention will be more apparent from the following description of the preferred embodiments with reference to the accompanying drawings, wherein:

FIG. 9 is a diagram for explaining the contents of a memory unit utilized in a preferred embodiment of the present invention;

FIG. 15 is a diagram showing a VCM current and a temperature waveform related to a first modification of a seek control in a preferred embodiment of the present invention; and FIG. 16 is a diagram showing a VCM current and a temperature waveform related to a second modification of a seek control in a preferred embodiment of the present invention.

DESCRIPTION OF THE PREFERRED EMBODIMENT

Hereinafter, the description of some preferred embodiments according to the present invention will be given with reference to the accompanying drawings of FIGS. 4 through 16.

Figure 4:
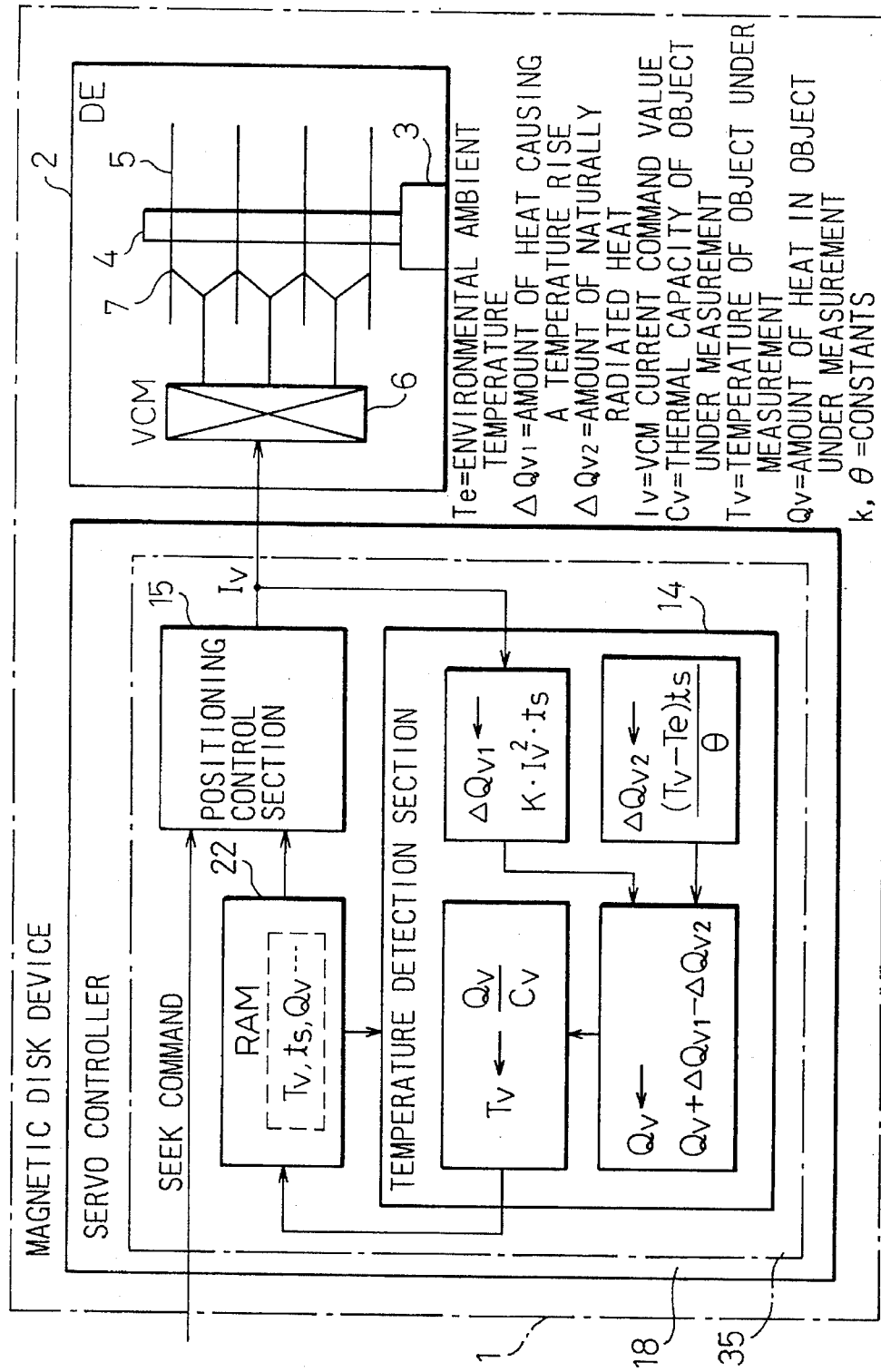
FIG. 4 is a block diagram showing an essential embodiment based on the principle of the present invention.

FIG. 4 is a block diagram showing an essential embodiment based on the principle of the present invention. Hereinafter, any component which is the same as that mentioned before will be referred to using the same reference numeral. In this case, an example of a seek control system according to the present invention, which is applied to a magnetic disk device 1, will be representatively illustrated.

In this drawing, 18 denotes a servo controller; 14 denotes a temperature detection section; 15 denotes a positioning control section; 22 denotes a RAM; and 35 denotes a VCM control section.

Preferably, these units such as a servo controller 18 and a temperature detection section 14 are realized by a CPU of a computer system.

A seek control system according to the present invention has the following construction for the purpose of solving the above-described problems.

(a) In a disk device in which the object measured is a mechanism including a VCM 6 which positions a head, its temperature being detected and a seek operation being controlled based on the detected temperature of the VCM 6, the seek control system is adapted to determine the amount of heat causing a temperature rise ($\Delta Qv_1$) of the object under measurement as the square of the VCM current command value (Iv) with respect to the VCM 6 times a coefficients (K and ts), and to integrate the result of subtracting the amount of naturally radiated heat ($\Delta Qv_2$)($Qv \leftarrow Qv + \Delta Qv_{1-\Delta Qv2}$) from the amount of heat ($\Delta Qv_1$) of the temperature rise to determine the amount of heat in the object under measurement (Qv) in order to detect the temperature (Tv) of the object under measurement (where $Tv=Qv/Cv$).

(b) The seek control system having the configuration as described in the item (a) further includes a function in which a calculation (Qv/Cv) on the basis of the determined amount of heat in the object under measurement (Qv) and the thermal capacity of the object under measurement (Cv) is performed to detect the temperature (Tv) of the object under measurement (where $Tv=Qv/Cv$).

(c) The seek control system having the configuration as described in the item (a), further includes a memory unit, e.g., a RAM 22 in which the thus detected temperature is stored, and includes a function in which, when a seek command is issued from a host device, each seek operation is divided into and executed as a number of minor seek operations in accordance with the thus detected temperature which has been stored in the RAM 22.

(d) The seek control system having the configuration as described in the item (a), further includes a memory unit, e.g., a RAM 22 in which the thus detected temperature is stored, and includes a function in which, when a seek command is issued from a host device, a seek control is performed by inserting a time interval between a given seek operation and the subsequent seek operation in accordance with the thus detected temperature which has been stored in the RAM 22.

(e) The seek control system having the configuration as described in the item (a), further includes a memory unit, e.g., a RAM 22 in which the thus detected temperature is stored, and includes a function in which, in accordance with the thus detected temperature which has been stored in RAM 22, the start and stop of a rotation of a cooling fan, and the rpm (revolutions per minute), i.e., rotational speed thereof are controlled.

(f) The seek control system having the configuration as described in the item (c) to (e), further includes a function in which, when a seek control is performed in accordance with the above-described detected temperature, the start and stop of the seek control and the details of the associated process are reported to the host device.

(g) The seek control system having the configuration as described in the item (c) to (e), is constructed so that a control function, which performs a seek control in accordance with the above-described detected temperature, can be set and canceled from the host device by a command or other means.

Further, the operation of present invention having the configuration as described above will be explained based on FIG. 4.

In the VCM control section 35 which is provided in the servo controller 18, the positioning control section 15 performs such functions as a seek control of the VCM 6, and in doing so the temperature detection section 14 within the VCM control section 35 executes temperature detection process, with he data resulting from the detection (detected temperature, etc.) being stored in RAM 22.

This temperature detection process is performed in the following manner.

First, at the temperature detection section 14, the square of the VCM current command value (Iv), Iv×Iv is multiplied by the constant K and by the sampling time ts, to determine the amount of heat $\Delta Qv_1$ of the temperature rise (where $\Delta Qv_1 = K \times Iv \times Iv \times ts$), this being stored in the RAM 22.

Next, the temperature Tv of the object under measurement, the environmental ambient temperature Te, the constant θ, and the sampling time ts are used to perform the calculation of $\{(Tv-Te)/\theta\} \times ts$ to calculate the amount of naturally radiated heat $\Delta Qv_2$ [$\{=(Tv-Te)/\theta\} \times ts$], this being stored in the RAM 22.

Then, the value, obtained by subtracting the naturally radiated heat $\Delta Qv_2$ of the object under measurement from the amount of heat $\Delta Qv_1$ causing the temperature rise, is integrated ($Qv \leftarrow Qv + \Delta Qv_1 - \Delta Qv_2$) to determine the amount of heat Qv causing the temperature rise of object under measurement, this being stored in the RAM 22.

Finally, the above-noted new amount of heat in the object under measurement Qv and the thermal capacity Cv of the object under measurement are used to perform the calculation (division) of Qv/Cv, this giving the newly detected temperature Tv (Tv=Qv/Cv) and Tv being stored in the RAM 22. The above process is performed and the temperature Tv of the object under measurement is detected and stored in the RAM 22 for every sampling time ts.

When the positioning control section 15 executes seek operations, the data stored in the RAM 22 is read out and then seek is performed. When doing this, the following methods are mentioned as the techniques for performing seek control.

In the first seek control method, when seek operations are executed, if the detected temperature value exceeds a reference value, the start of the seek control is delayed according to the detected temperature value. If this is done, it is possible to limit the temperature rise of the VCM.

In the second seek control method, each seek operation is divided into a number of minor seek operations.

In addition to and separate from the above-noted seek control methods, the detected temperature can be used to control the rpm of a cooling fan.

At the VCM control section 35, the start and stop of the above-noted seek control and the details of the associated process are reported to a host device. Also, it is possible to set or cancel the control function that performs a seek control in accordance with the above-noted detected temperature from a host device by a command or other means.

As described above, it becomes possible to detect the VCM temperature with high accuracy. Further, on the basis of the thus detected temperature, it becomes possible to perform seek control so that the VCM temperature does not rise excessively, thereby minimizing the reduction in a throughput of the disk device, e.g., the magnetic disk device.

Next, more concrete embodiments of the present invention will be explained with reference to FIG. 5 through FIG. 16.

Figure 5:
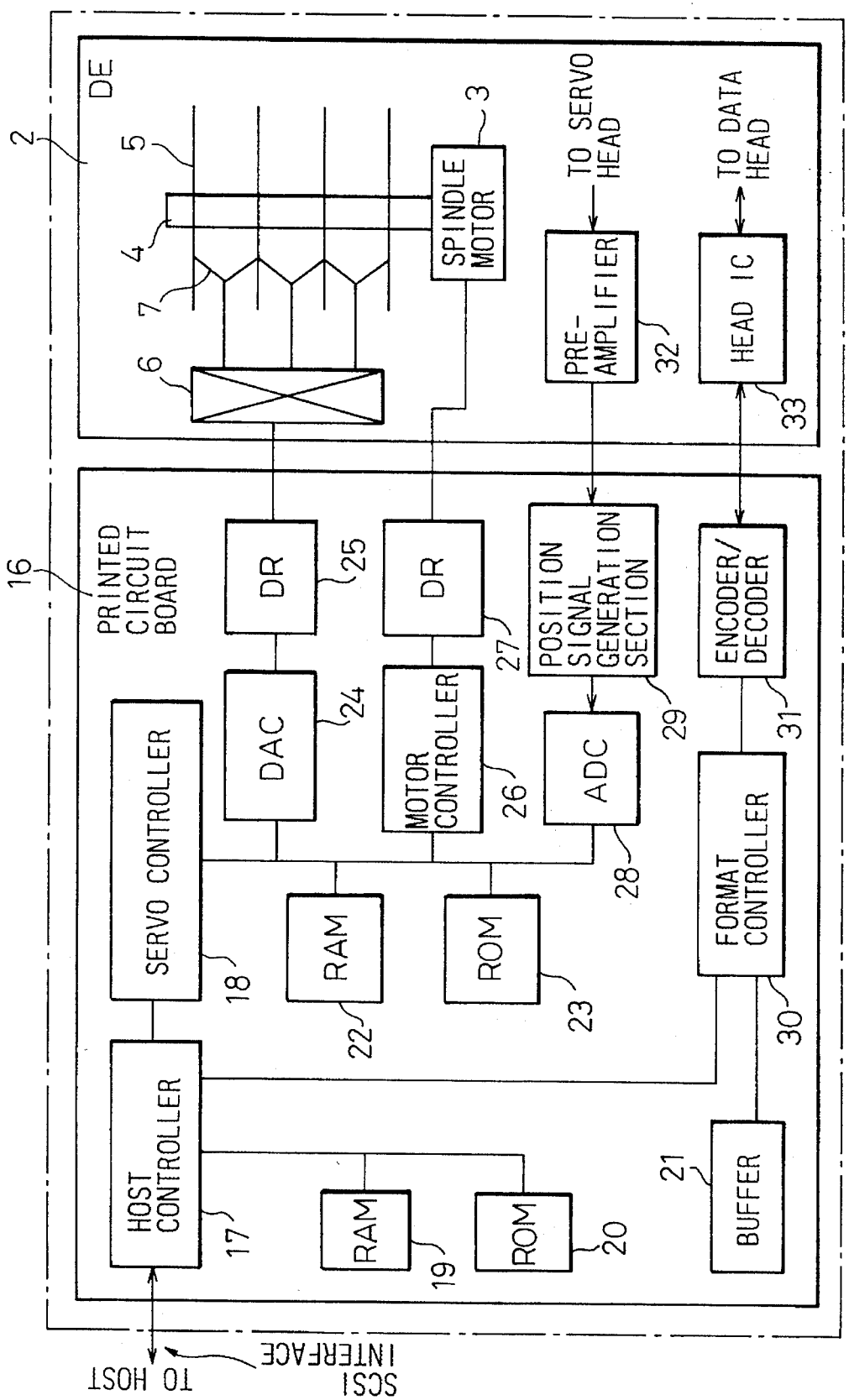
FIG. 5 is a block diagram showing a preferred embodiment of the present invention which is applied to a magnetic disk device.
Figure 6:
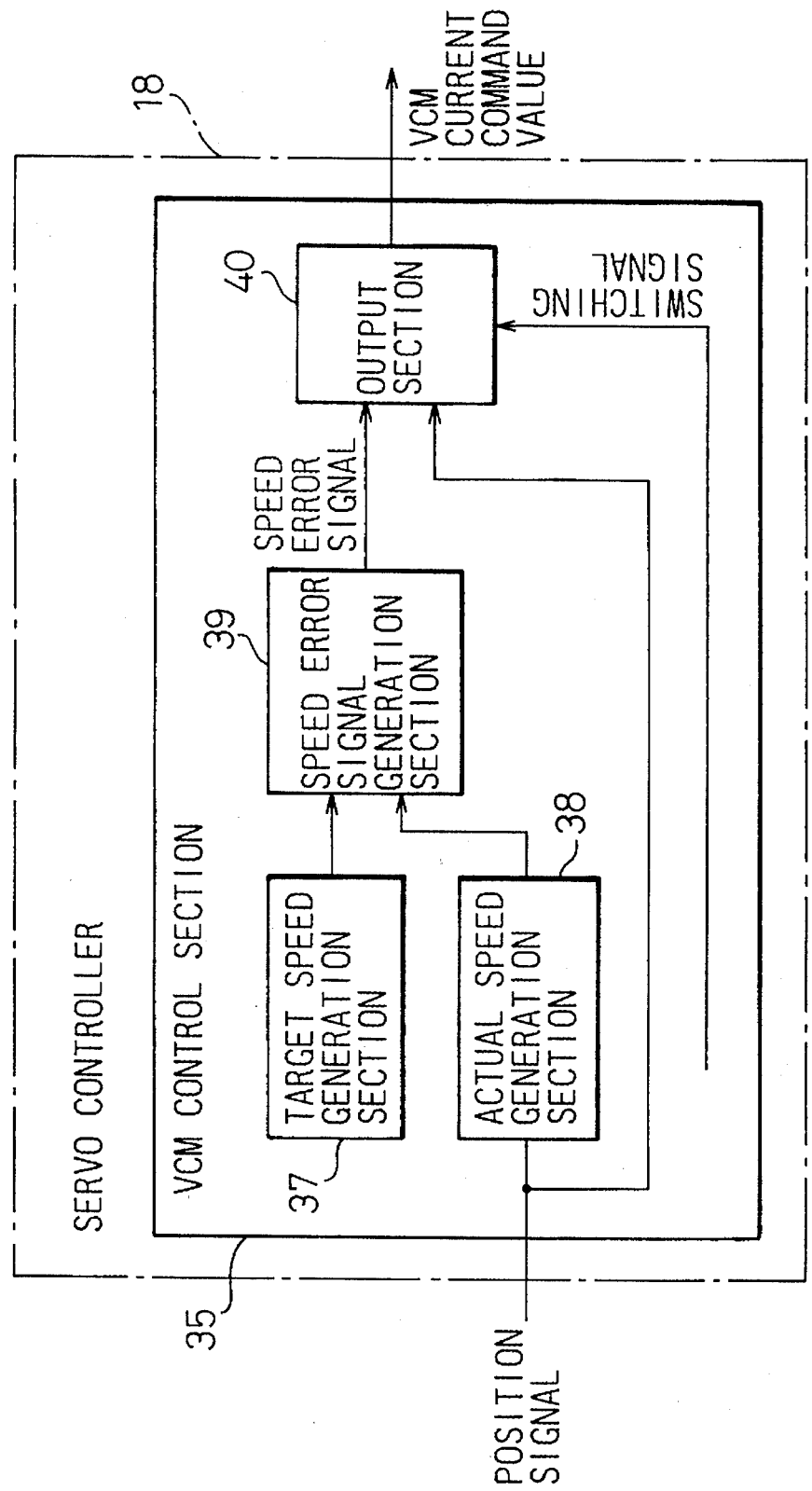
FIG. 6 is a block diagram showing in detail a configuration of a servo controller of a preferred embodiment of the present invention shown in FIG. 5.
Figure 7:
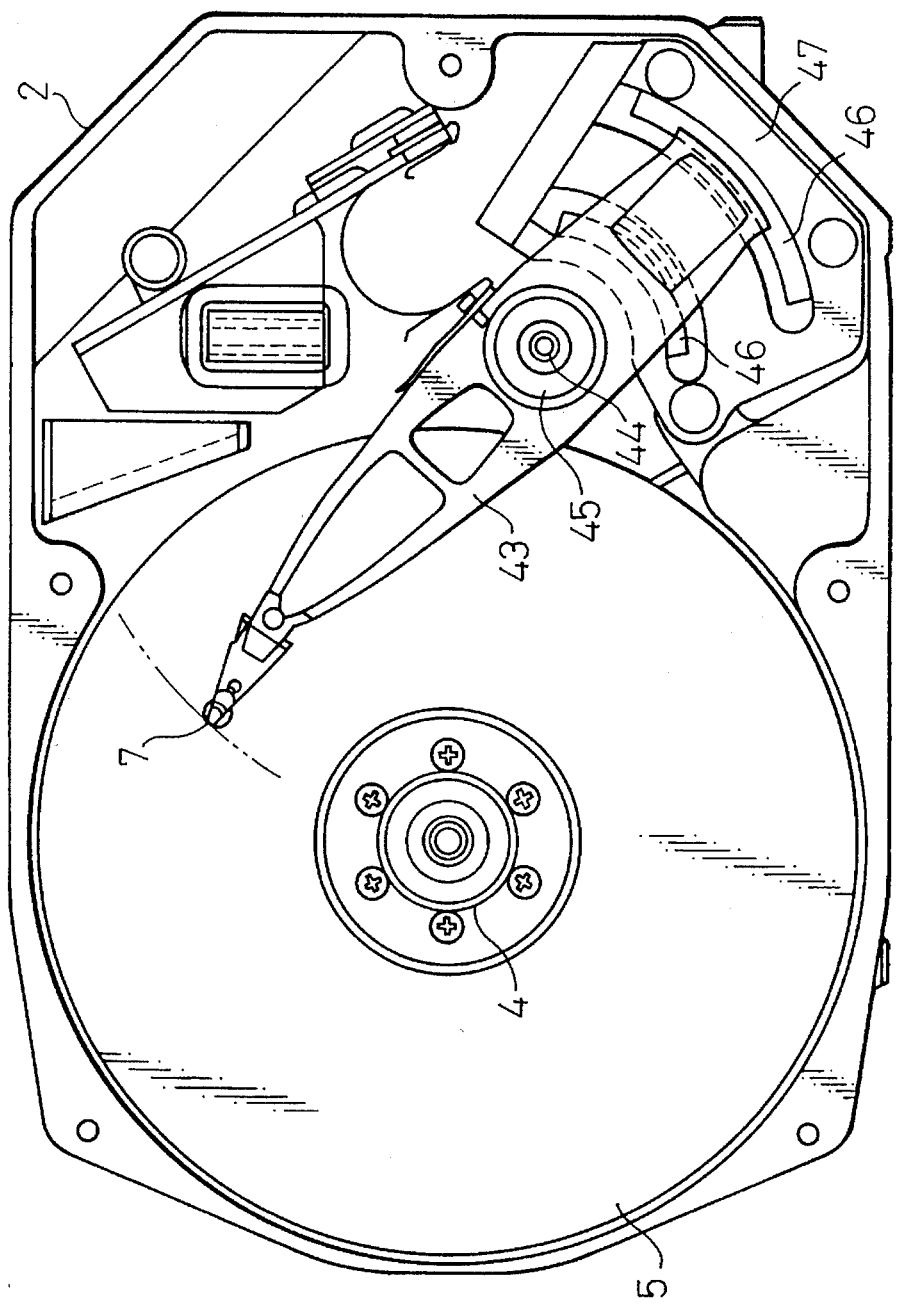
FIG. 7 is a top view showing the inside of a disk enclosure in a preferred embodiment of the present invention.
Figure 8:
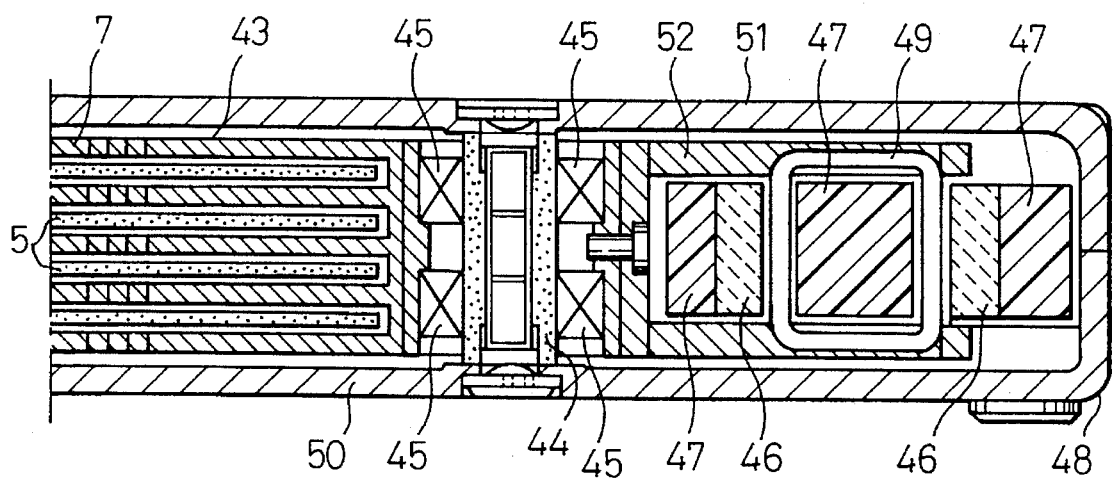
FIG. 8 is a cross-sectional side view showing the inside of a disk enclosure in a preferred embodiment of the present invention.

FIG. 5 is a block diagram showing a preferred embodiment of the present invention which is applied to a magnetic disk device; FIG. 6 is a block diagram showing in detail a configuration of a servo controller of a preferred embodiment of the present invention shown in FIG. 5; FIG. 7 is a top view showing the inside of a disk enclosure in a preferred embodiment of the present invention; and FIG. 8 is a cross-sectional side view showing the inside of a disk enclosure in a preferred embodiment of the present invention.

In these drawings, 16 denotes a printed circuit board; 17 denotes a host controller; 19 denotes RAM (volatile memory); 20 and 23 denote ROMs (non-volatile memories); 21 denotes a buffer; 24 denotes a digital/analog converter (hereinafter referred to as "DAC"); 25 and 27 denote drivers; 26 denotes a motor controller; 28 denotes an analog/digital converter (hereinafter refereed to as "ADC"); 29 denotes a position signal generation circuit; 30 denotes a format controller; 31 denotes an encoder/decoder; 32 denotes a pre-amplifier; 33 denotes a head IC (integrated circuit device); 37 denotes a target speed generation section; 38 denotes an actual speed generation section; 39 denotes a speed error signal generation section; 40 denotes an output section; 43 denotes a carriage; 44 denotes a shaft; 45 denotes a bearing; 46 denotes a magnet; 47 denotes a magnetic circuit; 49 denotes a coil; 50 denotes a base; 51 denotes a cover; and 52 denotes a coil support section.

1: Description of the Construction of the Magnetic Disk Device 1 (Refer to FIG. 5)

FIG. 5 shows a block diagram of a magnetic disk device. As shown in this drawing, the magnetic disk device 1 comprises a printed circuit board 16 and a disk enclosure 2.

The printed circuit board 16 has a host controller 17, a servo controller 18, a RAM 19, a RAM 22, a ROM 20, a ROM 23, a buffer 21, a DAC 24, a driver 25, a driver 27, a motor controller 26, an ADC 28, a position signal generation circuit 29, a format controller 30, and an encoder/decoder 31.

Disk enclosure 2 has a pre-amplifier 32, a head IC 33, a spindle motor 3, a spindle 4, magnetic disks 5, a voice coil motor (VCM) 6, and magnetic heads 7. The functions of each of the above-noted parts are described below.

①: The above-noted host controller 17 transfers commands to and from the host device via a SCSI (Small Computer System Interface) interface, performs data transfer, and performs various control functions within the disk device.

②: The servo controller 18 performs servo control with respect to, for example, the VCM 6 and the spindle motor 3. This servo controller 18 has a VCM control section which performs control of the VCM 6 and a spindle motor control section which performs control of the spindle motor 3.

③: The RAM 19 is a memory to which an access is executed by the host controller 17.

④: The RAM 22 is a memory to which an access is executed by the servo controller 18. This RAM 22 stores in it a variety of data used in the temperature detection process (details will be described later).

⑤: The ROM 20 is a non-volatile memory to which an access is executed by the host controller 17, and is used to store programs and data.

⑥: The ROM 23 is a non-volatile memory to which an access is executed by the servo controller 18, and is used to store programs and a variety of data used in the temperature detection process (details will be to be described later).

⑦: An access is executed to the buffer 21 by the format controller 30.

⑧: The DAC 24 converts the digital signal output from the servo controller 18 (DAC setting value) to an analog signal.

⑨: The driver 25 drives the VCM 6 based on the output signal from DAC 24.

⑩: The driver 27 drives the spindle motor 3 based on the signal from the motor controller 26.

⑪: The motor controller 26 controls the rpm of the spindle motor 3.

⑫: The ADC 28 converts the analog signal output from the position signal generation circuit 29 (position signal) to a digital signal.

⑬: The position signal generation circuit 29 generates a position signal from the pre-amplifier output signal (servo signal).

⑭: The format controller 30 performs formatting for reading/writing with respect to the magnetic disk (medium).

⑮: The encoder/decoder 31 performs encoding or decoding of read/write data.

⑯: The pre-amplifier 32 accepts the servo signal read out from the servo surface of the magnetic disk 5 by the servo head (one of the magnetic heads 7) and amplifies this signal.

⑰: The head IC 33 drives the data head (a magnetic head for reading from and writing to a magnetic disk 5) and performs reading/writing of data.

⑱: The spindle motor 3 rotationally drives the magnetic disks 5 via the spindle 4.

⑲: The VCM 6 drives and positions the magnetic heads 7 in the radial direction with respect to the magnetic disks 5.

⑳: The magnetic heads 7 consist of data heads and a servo head. The data heads are provided for the purpose of performing reading and writing of data with respect to a magnetic disk 5, while the servo head is provided for the purpose of reading a servo signal from the dedicated servo surface of a magnetic disk 5.

2: Description of the Servo Controller 18 (Refer to FIG. 6)

FIG. 6 is a drawing which explains the servo controller. As shown in this drawing, the servo controller contains a VCM control section 35, this VCM control section comprising a target speed generation section 37, an actual speed generation section 38, a speed error signal generation section 39, and an output section 40. Each of these parts can be implemented, for example, in firmware, rather than hardware. The functions of each of these parts are described below.

①: The target speed generation section 37 generates the target speed signal. In this target speed generation section 37, a value corresponding to the number of remaining cylinders (a group of tracks, to which a seek is executed simultaneously by moving the magnetic heads 7, are referred to a cylinder) is determined by a table look-up, this value being generated as the target speed.

②: The actual speed generation section 38 generates the actual speed signal (i.e., it measures the actual speed) from the position signal generated by the position signal generation circuit 29.

③: The speed error signal generation section 39 determines the difference between the target speed output from the target speed generation section 37 and the actual speed output from the actual speed generation section 38 (i.e., target speed—actual speed) and outputs the value corresponding to the difference as the speed error signal.

④: The output section 40 performs a switching operation between the speed error signal output from the speed error signal generation section 39 and the position signal, in accordance with a switching signal (a signal generated within the VCM control section).

When the speed error signal is output, the output signal is equivalent to the product of the error signal and a constant. The output signal of the output section 40 is sent to the DAC 24 as the VCM current command value.

The operation of the above-noted VCM control section 35 is as follows. When a seek control is performed, a first speed control of the VCM 6 is performed, and afterward, when the magnetic heads 7 reach (or approach) the area of the desired cylinder, position control (fine control) is performed to achieve positioning of the magnetic heads.

First, the above-noted speed control is performed, and when this is done the target speed generation section 37 generates the target speed, and the actual speed generation section 37 generates the actual speed. Then the speed error signal generation section 39 calculates the difference (target speed—actual speed) from these two speeds, and outputs the result of this calculation as the speed error.

Next, the output section 40 makes a calculation to determine the product of the speed error output from the speed error output signal generation section 39 and a constant, the value of the product resulting from that calculation being output to the DAC 24 as the VCM command value. Speed control is performed by means of the above-described process.

Thereafter, when the magnetic heads 7 reach the region of the target cylinder, the switching signal causes the output section 40 to be switched, so that a position signal is output to the DAC 24. This performs position control to achieve positioning of the magnetic heads 7 at the target position.

3: Description of the Disk Enclosure (Refer to FIG. 7 and FIG. 8)

FIG. 7 is a top view of the disk enclosure, and FIG. 8 is a partial cross-sectional side view of the disk enclosure. The construction on the inside of the disk enclosure 2 is as shown in these drawings.

As shown in the drawings, the disk enclosure 2 has a base 50 and a cover 51. Inside the disk enclosure 2, a number of magnetic disks 5 are mounted in a spindle 4. Further, the VCM 6 is provided in an area surrounding the magnetic disks 5.

This VCM 6 comprises a coil 49, a magnetic circuit 47, and a magnet 46, and is constructed so that the coil 49 can move. The coil 49 is fixed to a coil support section 52 which is provided on one end of carriage 43, and the carriage 43 is constructed so as to rotate about shaft 44 as a center via the bearing 45.

On the end of above-noted carriage 43 (the opposite end from the coil support section 52) are magnetic heads 7, these being constructed to move by means of the carriage in a radial direction with respect to the magnetic disks.

When the VCM 6 is driven so that a current flows in coil 49, an electromagnetic force is generated in accordance with the direction and magnitude of the drive current, and this causes the carriage 43, to which the coil 49 is mounted, to rotate about shaft 44. The rotation of this shaft 44 moves the magnetic head 7 in a substantially radial direction, with respect to the magnetic disk 5 to perform seek operations.

4: Description of Contents of a Memory Unit
(Refer to FIG. 9)

FIG. 9 is a diagram for explaining the contents of a memory unit utilized in a preferred embodiment of the present invention, with part A of FIG. 9 showing the contents of the ROM 23 and part B of FIG. 9 showing the contents of the RAM 22.

When performing an overheating countermeasure control, the servo controller 18 accesses the ROM 23 and the RAM 22 in performing this control. In doing this, the ROM 23 has data stored in it in advance. Detection data and a variety of other data are stored into the RAM 22 when a seek control is performed.

Data stored in the above-noted ROM 23 includes, as shown in the drawing, K (a constant), θ(a constant dependent on a thermal resistance), Cv (the thermal capacity of the object under measurement), Te (the environmental ambient temperature), ts (sampling time), "a" (a constant), and "b" (a constant). These data are stored in advance into the ROM 23 and are read out by the VCM control section 35 within the servo controller 18 when the device operates.

Data stored into the RAM 22 includes, as shown in the drawing, Iv (the VCM command current value), $\Delta Qv_1$ (amount of heat of the temperature rise), $\Delta Qv_2$ (amount of naturally radiated heat), Qv (amount of heat in the object under measurement), and Tv (temperature of the object under measurement). In addition, the RAM 22 also contains timer data (from a software timer) set into it.

5: Description of Temperature Detection Process
and Overheating Countermeasure Control Control of the VCM 6 is performed by the VCM control section 35 of the servo controller 18, and the temperature detection process is executed by the VCM control section 35, the results of the detection being stored into RAM 22. The temperature detection process is described below.

In order to perform positioning control of the magnetic heads 7 and VCM current control, the VCM control section performs an interrupt process at periodic intervals. The interrupt interval is a value of, for example, approximately 66μ sec.

That is, the VCM control section 35 usually is performing such tasks as monitoring of seek commands from the host controller 17, and also periodically generates interrupts. At the time when each of the interrupts is generated, the currently executed process is interrupted and the interrupt process is performed.

As part of this interrupt process, position detection of the magnetic head 7 is performed, as is control of the value of the current flowing in the VCM 6. By means of these interrupts, the position and current value sensed by the VCM control section 35 are updated at predetermined intervals.

Detection of temperature is also performed during the above-described interrupts. When this is done, the time elapsed since the previous interrupt (a predetermined and fixed interrupt interval, called the "sampling time"), the value of the drive current, and the thermal capacity of the object under measurement are used to calculate the amount of change in temperature, this being stored into the RAM 22 as the new temperature.

The data stored in RAM 22 as described above is read out when a seek control is executed during overheating countermeasure control. The method of a seek control in this case is as described below.

I. The first seek control method is that in which if the detected temperature when a seek control is executed exceeds a reference value, the start of the seek control is delayed, in accordance with the difference between the detected temperature and the reference value. This enables limitation of the rise in temperature.

II. The second seek control method is that in which each seek operation is divided into a number of minor seek operations.

In addition to and separate from the above-noted seek control methods, the detected temperature can be used to control the rpm of a cooling fan and the start and stop of a rotation of the cooling fan. In doing this, the timing of the switching of the rpm of the cooling fan may be set during the above-described interrupts, or during the other process corresponding to a different interrupt in other timing having a longer interval.

6: Description of Temperature Detection by
Means of a Flowchart (Refer to FIG. 10)

Figure 10:
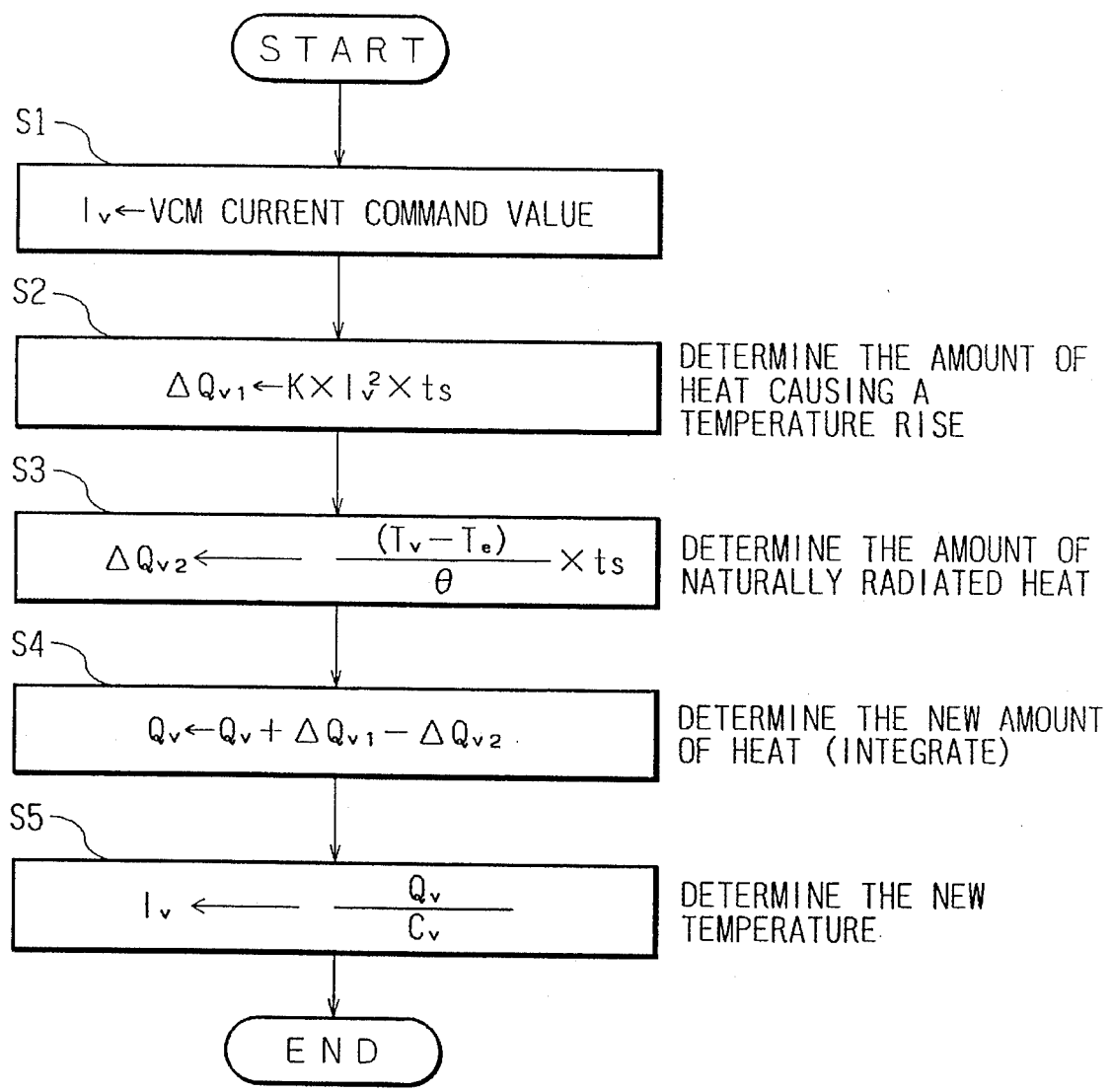
FIG. 10 is a flowchart for explaining a process for detecting a temperature of a VCM in a preferred embodiment of the present invention.

FIG. 10 is a flowchart for explaining a process for detecting the temperature of the VCM in a preferred embodiment of the present invention. The temperature detection process performed by the VCM control section 35 will be described below, with reference to the flowchart of FIG. 10. In this flowchart, steps S1 through S5 indicate processing steps.

The process described below is performed by the VCM control section 35, with the assumption that the data shown in FIG. 9 has been stored into the ROM 23 and the RAM 22. When an electric power is applied to the disk device, Te (the environmental ambient temperature) is read out from the ROM 23, this value of Te being stored into the RAM 22 as the initialization value of Tv (the temperature of the object under measurement).

First, the VCM current command value is set as Iv (step S1) and then the thus set value is squared (Iv×Iv) and multiplied by the constant K and the sampling time ts to determine the amount of heat $\Delta Qv_1$ causing the temperature rise (where $\Delta Qv_1 = K \times Iv \times Iv \times ts$). The result of the calculation ($\Delta Qv_1 \leftarrow K \times Iv \times Iv \times ts$) is stored into the RAM 22 (step S2).

Next, the temperature of the object under measurement Tv, the environment ambient temperature Te, the constant ←, and the sampling time ts are used in the calculation of {(Tv−Te)/θ}×ts, which is the value of the amount of heat which is naturally radiated (Δ Qv$_2$). The result of the calculation [Δ Qv$_2$←{(Tv−Te)/θ}×ts] is stored into the RAM 22 (step S3).

Then the amount of naturally radiated heat Δ Qv$_2$ is subtracted from the amount of heat causing the temperature rise Δ Qv$_2$, and the difference resulted from the subtraction is integrated (Qv←Qv+Δ Qv$_1$−Δ Qv$_2$) to determine the amount of heat Δ Qv of the object under measurement. The result of the calculation (Qv←Qv+Δ Qv$_1$−Δ Qv$_2$) is stored into RAM 22 (step S4).

Finally, the above-described newly determined amount of heat Qv in the object under measurement and the thermal capacity Cv of the object under measurement are used in the calculation of Qv/Cv, which is the new temperature Tv, this value being stored into RAM 22 (step S5).

The above process is repeated, with the temperature Tv detected and stored into the RAM 22, at every sampling time ts. Then the data stored into the RAM 22 is read out when performing a seek control.

7: Description of a Seek Control
(Refer to FIG. 11)

Figure 11:
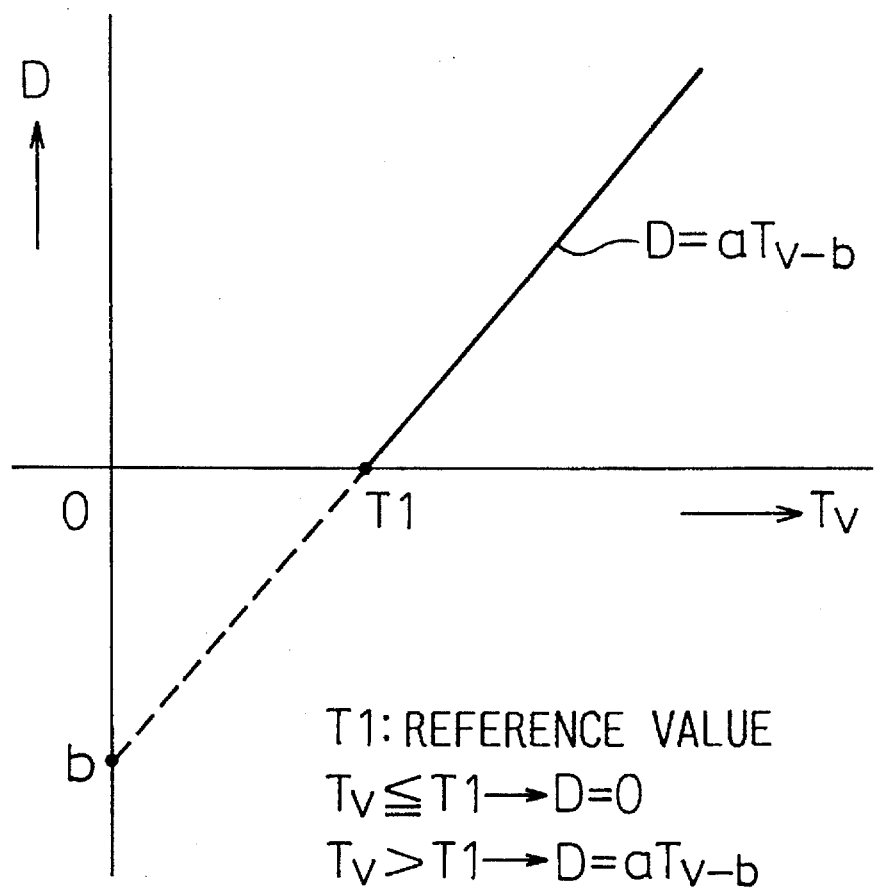
FIG. 11 is a graph for explaining a seek control in a preferred embodiment of the present invention.

FIG. 11 is a graph for explaining a seek control in a preferred embodiment of the present invention. At the VCM control section 35, a seek control is performed in accordance with a seek command received from a host device. When doing this, in this embodiment, the above described first method of a seek control is used. That is, if the detected temperature value exceeds the reference value, the start of the seek control is delayed in accordance with the difference between the detected temperature and the reference value. This seek control method is described below in detail.

In FIG. 11, the horizontal axis represents the temperature Tv and the vertical axis represents the amount of delay D, where D=aTv−b (where "a" and "b" are constants which are stored into the ROM 23).

In this case, the amount of delay D changes as follows in accordance with the temperature Tv. If the reference value with respect to the temperature Tv is T1, in the region Tv≦T1, D becomes zero (D=0), and in the region Tv>T1, D is defined by the equation D=aTv−b.

Therefore, when seek operations are performed, if the temperature Tv is below the reference value T1, the seek control is performed immediately upon receipt of the seek command. However, if the temperature Tv exceeds the reference value T1, the seek is performed after a delay time which is a function of the temperature Tv (the delay time being proportional to the difference Tv−T1).

8: Description of the Seek Process
(Refer to FIG. 12 and FIG. 13)

Figure 12:
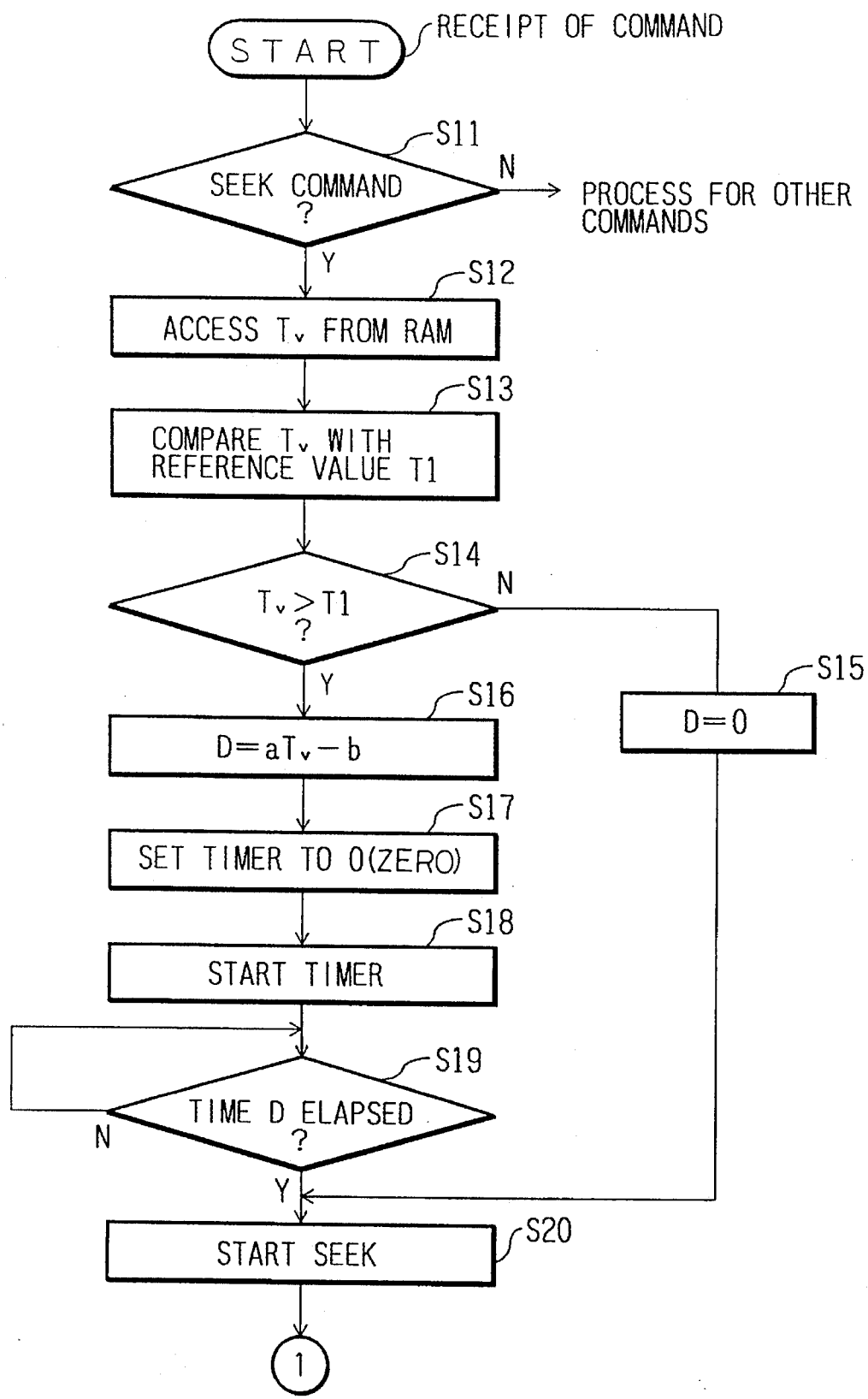
FIG. 12 is a flowchart for explaining a first part of a process for executing a seek operation in a preferred embodiment of the present invention.
Figure 13:
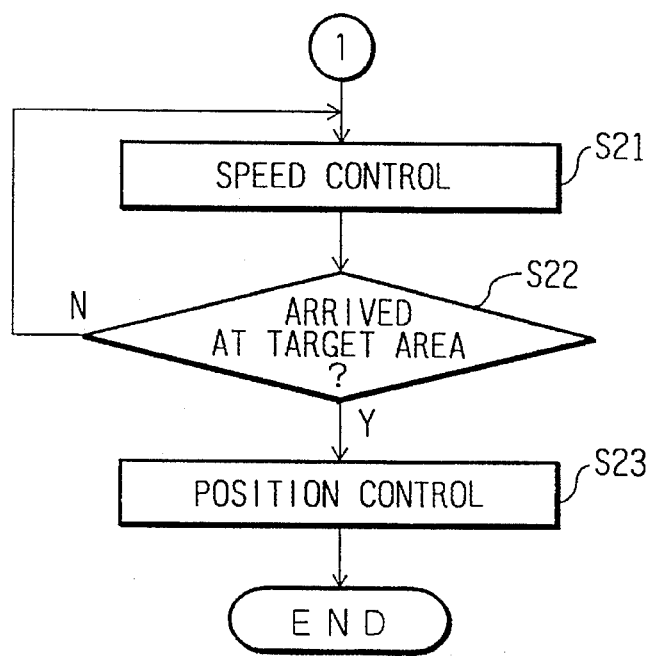
FIG. 13 is a flowchart for explaining a second part of a process for executing a seek operation in a preferred embodiment of the present invention.

FIG. 12 is a flowchart for explaining a first part of a process for executing a seek operation in a preferred embodiment of the present invention, and FIG. 13 is a flowchart for explaining a second part of the process. The seek process performed by the VCM control section within the servo controller will be explained below, with reference to the flowcharts shown in FIG. 12 and FIG. 13. In these flowcharts, steps S11 through S23 are processing steps.

When a seek command is received from the host device (step S11), the VCM control section 35 refers to the temperature Tv which is stored in the RAM 22 (step S12) and performs a comparison of that temperature value Tv with a reference value T1 that has been established in advance (step S13).

As a result of this comparison, if Tv>T1 (step S14), the amount of delay D is established according to the formula D=aTv−b (i.e., by calculating the amount of delay D, which is the function of aTv−b with respect to Tv) (step S16). Then, the amount of delay D established by this process is set into a timer (software timer in the RAM 22) (step S17). Then, the above-noted timer is started (step S18) and when the above-noted set time corresponding to the amount of delay D has elapsed (step S19), the VCM control section 35 starts the seek operations (step S20). If D is set to 0 (zero) in the above-described process (step S15), the seek operations are performed immediately (step S20).

When the seek operation starts as shown in FIG. 13, first the VCM performs a speed control (step S21), and when the target region is reached (step S22), it performs a position control (step S23) and all the seek operations are completed.

9: Description of a Speed Control
(Refer to FIG. 14)

Figure 14:
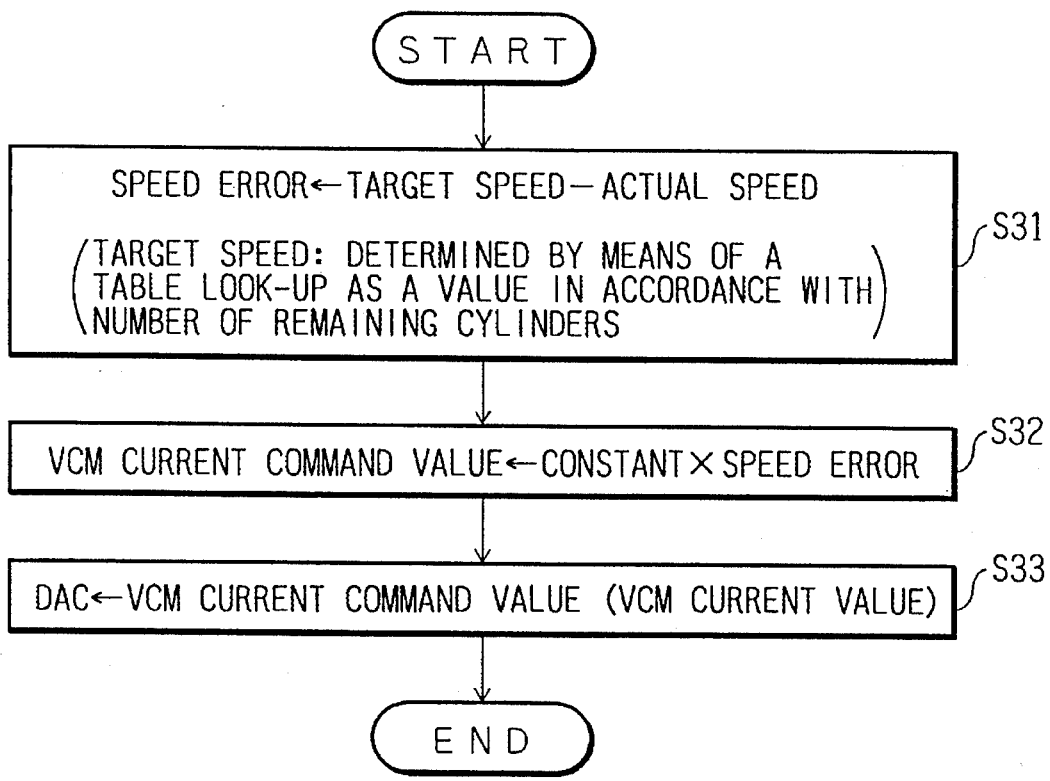
FIG. 14 is a flowchart for explaining a sequence of speed control during seek operations shown in a step S21 of FIG. 13.

FIG. 14 is a flowchart for explaining a sequence of speed control during seek operations shown in a step S21 of FIG. 13. The above-noted speed control process (details of the process at the step S21) will be described below, with reference to the flowchart of FIG. 14. This process is performed by the VCM control section 33, and steps S31 through S35 represent processing steps.

First, on the basis of the target speed and the actually determined speed, the difference between the two kinds of speeds (target speed —actual speed) is determined, the result corresponding to the difference being taken as the speed error (step S31). In this determination, the target speed is determined by means of a table look-up as a value in accordance with the number of remaining cylinders.

Next, a calculation is performed to determine the product of the above-noted speed error and a constant value, the value resulting from this calculation being taken as the VCM current command value (step S32). This VCM current command value (VCM current value) is set into the DAC. The above process performs a speed control.

10: Description of a VCM Current and a
Temperature Waveform (Refer to FIG. 15)

FIG. 15 is a diagram showing a VCM current and a temperature waveform related to a first modification of a seek control in a preferred embodiment of the present invention. In this drawing, (1) denotes a waveform of a VCM current value, and (2) denotes a waveform that shows the detected temperature. Each of time t1, t2, t3, t4, and so forth, in time base of FIG. 15 indicates the time when each seek command starts to be issued.

The waveform shown in FIG. 15 is generated when the seek command is issued continuously and when a seek control is performed according to the above-described first method of seek control. In this seek control method, when seek control is performed, if the detected temperature value exceeds the reference value, the start of the seek is delayed in accordance with that detected value of temperature.

For example, in the timing in which the seek command is issued at the time t1, the detected temperature is a value that is lower than the reference value. Therefore the VCM current value shown in the drawing is immediately set and a seek control is performed.

In the timing in which the seek command is issued at the time t2, the detected temperature is a value that is lower than the reference value. Therefore, the value of VCM current shown in the drawing is again immediately set and a seek control is performed.

However, in the timing in which the seek command is issued at the time t3, because the detected temperature is a value that is higher than the reference value, the seek is delayed from the time t3 by he amount of D1, so that a seek control is performed at the time t4 (where $t4=t3+D1$). In this case, D1 is determined from the value of the temperature Tv, using the formula $D1=aTv-b$ (refer to FIG. 11).

In the timing in which the seek command is issued at time t5, the detected temperature is a value higher than the reference value. Therefore, the seek control is delayed from the time t5 by the amount of D2, so that the seek control is performed at the time t6 (where $t6=t5+D2$). In this case, the value of D2 is calculated from the value of temperature Tv, using the formula $D2=aTv-b$.

By executing such a sequence as described above, when a seek command is issued, a seek control is performed by inserting an interval between seek commands. This process is capable of limiting the generation of heat.

11: Description of a Current and a Temperature Waveform (Refer to FIG. 16)

FIG. 16 is a diagram showing a VCM current and a temperature waveform related to a second modification of a seek control in a preferred embodiment of the present invention. In this drawing, (1) denotes a waveform of a VCM current value, and (2) denotes a waveform that shows the detected temperature. Each of time t1, t2, t3, t4, and so forth, in time base of FIG. 16 indicates the time when each seek command start to be issued.

The waveform shown in FIG. 16 is generated when the seek command is issued continuously and when a seek control is performed according to the above-described second method of seek control. In this seek control method, when seek control is performed, each seek operation is divided into a number of minor seek operations.

For example, in the timing in which the seek command is issued at the time t1, the detected temperature is a value that is lower than the reference value. Therefore, the VCM current value shown in the drawing is immediately set and a normal seek control is performed.

In the timing in which the seek command is issued at the time t2, the detected temperature is a value that is lower than the reference value, so that again the VCM current value shown in the drawing is immediately set and a normal seek control is performed.

However, in the timing in which the seek command is issued at the time t3, the detected temperature is a value that exceeds the reference value. In this case, therefore, a given one seek operation is divided between the times t3 and t4. In this technique, if, for example, one of the magnetic heads is to be moved from a position A to a position B, it is not moved directly from the position A to the position B, but rather is moved to a different position C at the time t3 (with the position C being an intermediate position between the position A and the position B), and thereafter it is moved from the position C to the position B at the time t4.

By executing this kind of divided seek operations, the peak VCM current value becomes smaller, and therefore it is possible to limit the generation of heat.

Thereafter, in the timing in which the seek command is issued at the seek command at the time t5, since the detected temperature is a value that is lower than the reference value, the VCM current value shown in the drawing is immediately set and a normal seek control is performed.

By doing the above, when a seek command is issued, it is possible to perform a seek control by division of the command into a number of minor seek commands. This enables the limitation of the amount of generated heat.

12: Description of other Functions

The above-described magnetic disk device has the following functions.

(a): By using the above-described VCM temperature, it is possible to provide a function which controls the start and stop of a rotation of a cooling fan and the rpm (rotational speed) of the cooling fan. In this case, the cooling fan control is performed by the servo controller 18, by referring to data in the RAM 22.

(b): In an overheating countermeasure control performed by the servo controller 18, it is possible to provide a function, which reports the start and stop of heat-generation control (the process of the above-described embodiment) due to a rise or drop in temperature, along with the details of the associated process, from the servo controller 18 to a host controller 17, and further which reports the same from the host controller to a host computer.

(c): It is possible to provide a function by which the VCM overheating countermeasure control executed by the servo controller 18 is set or canceled by a host device by means of commands, a switch, or other means.

(Other Embodiments)

Heretofore, the present invention has been described in terms of the above-mentioned embodiments, but can also be embodied as follows.

(a): It is possible to perform the above-described cooling fan control based on the detected temperature simultaneously with the above-described first seek control method or the above-described second seek control method. Alternatively, it is also possible to additionally perform the above-described cooling fan control based on the detected temperature, separate from either the above-described first seek control method or above-described second seek control method.

(b): It is possible to allow the cooling fan to cool the entire magnetic disk device. Alternatively, it is also possible to allow the cooling fan to cool only a portion of the disk enclosure in the magnetic disk device.

As described above, the embodiments of the present invention have the following effects.

First, when the VCM temperature is detected, because the detection process takes into consideration the naturally radiated heat, it is possible to always detect the VCM temperature accurately.

Second, even in the case in which a large current is continuously applied to the VCM, it is possible to perform accurate perdition of the danger of damage. Therefore, prevention of damage to the VCM due to the temperature rise can be realized.

Third, it is possible to effectively dissipate the heat generated in the VCM, with a minimum reduction in the throughput of the disk device.

Fourth, by performing a cooling fan control in accordance with the detected temperature, it is possible to further improve the effectiveness of dissipation of the heat generated in the VCM.

Fifth, by reporting the start and stop of an overheating countermeasure control (the control of the above-described embodiments) due to a rise or drop in temperature, along with the details of the associated process to a host device, it is possible to sense the associated conditions, thereby enabling remarkably efficient control.

Sixth, the ability to set or cancel the above-described overheating countermeasure control function from a host device by means of a command a switch or other means enables selection of a control function suitable for the type of process, thereby providing more flexible technique.

We claim:

1. A seek control system in a disk device including a positioning mechanism having a voice coil motor which positions a head for carrying out read/write operations based upon a detected temperature of said positioning mechanism, said seek control system comprising:

means for determining an amount of heat causing a temperature rise in said positioning mechanism as the square of a voice coil motor current command value, by which said voice coil motor is controlled to position said head, multiplied by a predetermined coefficient;

means for storing an amount of naturally radiated heat which is calculated in advance;

means for integrating, for each of a number of sampling periods, the difference between the amount of naturally radiated heat and the amount of heat causing the determined temperature rise, to calculate a new amount of heat in said positioning mechanism; and means for calculating the temperature of said positioning mechananism in accordance with the calculated new amount of heat in said positioning mechanism by determining the ratio between the calculated new amount of heat and the thermal capacity of the positioning mechanism.

2. A seek control system as set for in claim 1, wherein said system further comprises a memory unit for storing the calculated temperature of said positioning mechanism, and wherein, when a host device issues a command of seek control for controlling seek operations, the seek control is performed so as to automatically insert a time interval, in accordance with the calculated temperature stored in said memory unit, between a given seek operation and the subsequent seek operation.

3. A seek control system as set forth in claim 1, wherein said system further comprises a memory unit for storing the calculated temperature of said positioning mechanism, and wherein, when a host device issues a command of seek control for controlling seek operations, each seek operation is carried out by dividing it into a plurality of minor seek operations, in accordance with the calculated temperature stored in said memory unit.

4. A seek control system as set forth in claim 1, wherein said system further comprises a memory unit for storing the calculated temperature of said positioning mechanism, and wherein the start and stop of a rotation and rotational speed of a cooling fan for suppressing the temperature rise of said positioning mechanism are controlled in accordance with the calculated temperature stored in said memory unit.

5. A seek control system as set forth in claim 1, wherein said means for determining said amount of heat causing the temperature rise, said means for integrating, and said means for calculating said temperature of said positioning mechanism are realized by a CPU of a computer system.

6. A seek control system as set forth in claim 2, wherein, when a seek control is performed in accordance with the calculated temperature, said seek control system reports the start and stop of the seek control, and the contents of control process related to the seek control, to said host device through a host controller.

7. A seek control system as set forth in claim 2, wherein said seek control system sets and cancels a control function command from said host device for performing seek control, in accordance with the calculated temperature.

8. A seek control system as set forth in claim 2, wherein said memory unit is constituted by a RAM of a computer system.

9. A seek control system as set forth in claim 3, wherein, when a seek control is performed in accordance with the calculated temperature, said seek control system operates to report the start and stop of the seek control, and the contents of control process related to the seek control, to said host device.

10. A seek control system as set forth in claim 3, wherein said seek control system sets and cancels a control function command from said host device for performing seek control, in accordance with the calculated temperature.

11. A seek control system as set forth in claim 3, wherein said memory unit is constituted by a RAM of a computer system.

12. A seek control system as set forth in claim 4, wherein, when a seek control is performed in accordance with the calculated temperature, said seek control system operates to report the start and stop of the seek control, and the contents of control process related to the seek control, to a host device which issues a seek control command.

13. A seek control system as set forth in claim 4, wherein said seek control system sets and cancels a control function for performing seek control in accordance with the calculated temperature, on the basis of an instruction from a host device which issues a seek control command.

14. A seek control system as set forth in claim 4, wherein said memory unit is constituted by a RAM of a computer system.

* * * * *

UNITED STATES PATENT AND TRADEMARK OFFICE
CERTIFICATE OF CORRECTION

PATENT NO. : 5,594,603
DATED : January 14, 1997
INVENTOR(S) : Mori et al.

Figure 1:
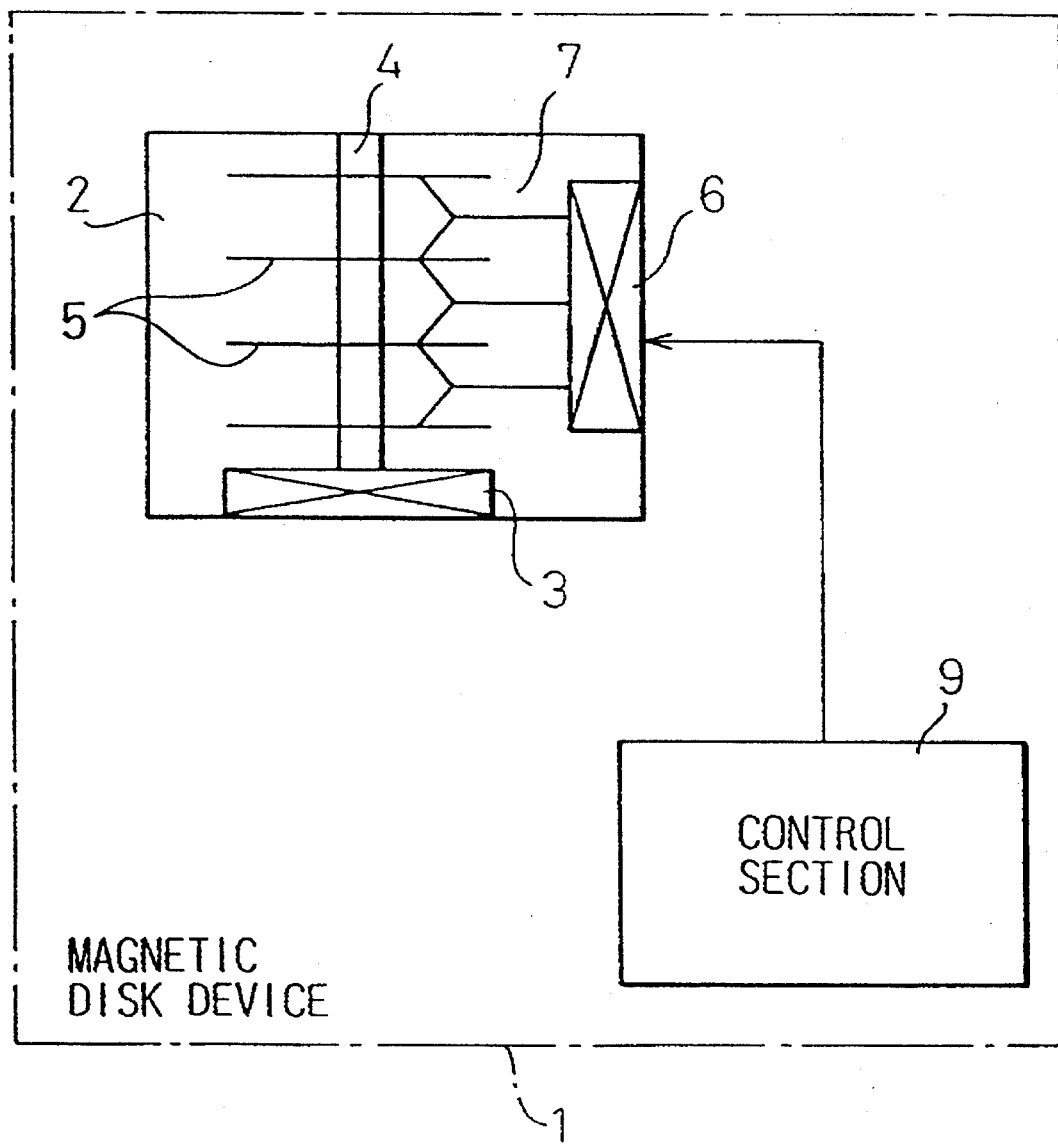
FIG. 1 is a block diagram showing a configuration of a conventional magnetic disk device.
Figure 2:
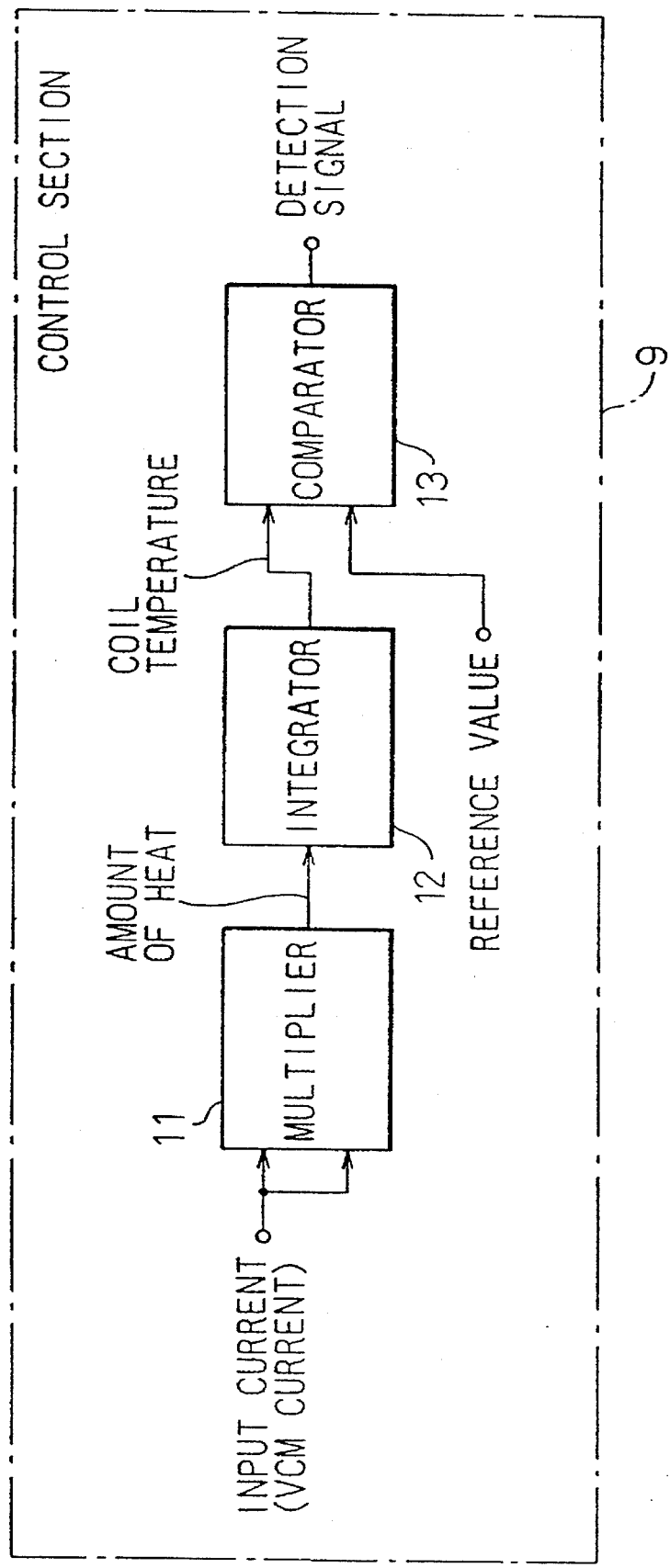
FIG. 2 is a block diagram for explaining a technique for detecting a temperature of a VCM according to the prior art.
Figure 3:
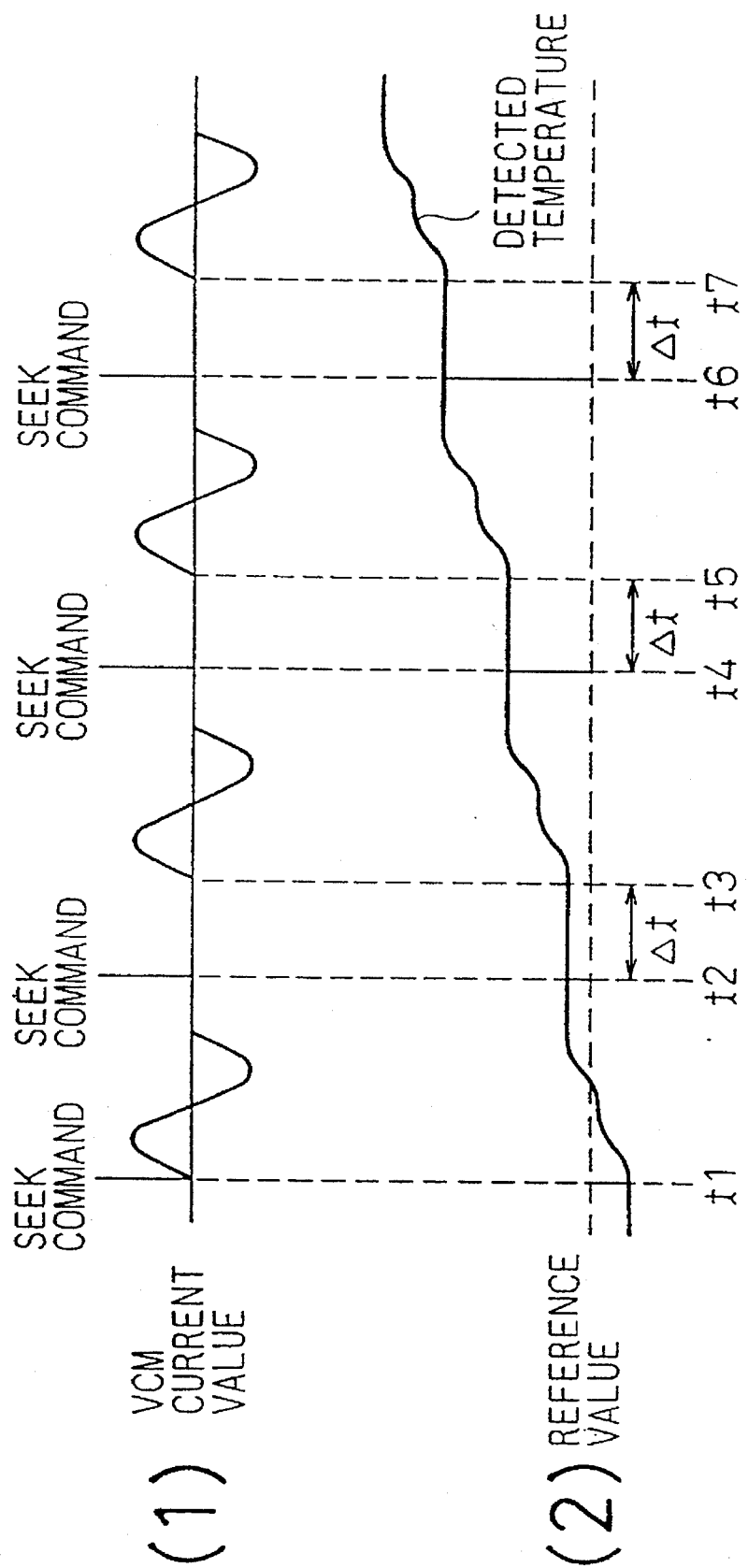
FIG. 3 is a diagram showing a VCM current and a temperature waveform related to the prior art.

It is certified that error appears in the above-indentified patent and that said Letters Patent is hereby corrected as shown below:

Column 1, line 45, delete "FIG. 2" and insert --FIG. 1--.

Column 6, line 5, delete "that".

Column 6, line 30, delete "$\Delta_{Qv2}$" and insert --$\Delta Q_{v2}$--.

Column 7, line 20, delete "he" and insert --the--.

Column 7, line 34, delete "$[\{=(Tv-Te/\theta\}\times ts]$" and insert --$[=\{(Tv-Te)/\theta\}\times ts]$--.

Column 8, line 31, delete "refereed" and insert --referred--.

Column 9, line 15, delete "to be".

Column 12, line 67, delete "-" and insert --$\theta$--.

UNITED STATES PATENT AND TRADEMARK OFFICE
CERTIFICATE OF CORRECTION

PATENT NO. : 5,594,603
DATED : January 14, 1997
INVENTOR(S) : Mori et al.

It is certified that error appears in the above-indentified patent and that said Letters Patent is hereby corrected as shown below:

Column 14, line 28, delete "section 33" and insert --section 35--.

Column 14, line 29, delete"S35" and insert --S33--.

Column 17, line 13, after "command", insert --,--.

Signed and Sealed this

Eighteenth Day of November 1997

BRUCE LEHMAN

*Attest:*

*Attesting Officer*   *Commissioner of Patents and Trademarks*